(12) United States Patent
DeBoalt

(10) Patent No.: US 10,400,924 B2
(45) Date of Patent: Sep. 3, 2019

(54) PIPE JOINT WITH LOW INSERTION LOAD, IMPROVED RETENTION AND INCREASED HIGH PRESSURE SEALING ABILITY GASKET AND METHOD OF MANUFACTURE THEREOF

(71) Applicant: American Cast Iron Pipe Company, Birmingham, AL (US)

(72) Inventor: Stephen L. DeBoalt, Pelham, AL (US)

(73) Assignee: American Cast Iron Pipe Company, Birmingham, AL (US)

( * ) Notice: Subject to any disclaimer, the term of this patent is extended or adjusted under 35 U.S.C. 154(b) by 719 days.

(21) Appl. No.: 14/757,570

(22) Filed: Dec. 24, 2015

(65) Prior Publication Data

US 2017/0184229 A1    Jun. 29, 2017

(51) Int. Cl.
*F16L 21/03* (2006.01)
*F16L 17/03* (2006.01)
*F16L 17/035* (2006.01)

(52) U.S. Cl.
CPC ............. *F16L 21/03* (2013.01); *F16L 17/03* (2013.01); *F16L 17/035* (2013.01)

(58) Field of Classification Search
CPC ......... F16L 21/03; F16L 21/02; F16L 21/025; F16L 17/03; F16L 17/035; F16L 17/06
USPC ........ 285/110–111, 113, 338–339, 374, 379, 285/910; 277/602, 604, 616, 626
See application file for complete search history.

(56) References Cited

U.S. PATENT DOCUMENTS

| | | |
|---|---|---|
| 2,953,398 A | 9/1960 | Haugen |
| 2,991,092 A | 7/1961 | Mackay |
| 4,428,604 A | 1/1984 | Conner |
| 4,432,571 A | 6/1984 | Conner |
| 4,456,288 A | 6/1984 | Conner |
| 4,524,505 A | 6/1985 | Conner |
| 4,643,466 A | 2/1987 | Conner |
| 4,685,708 A | 8/1987 | Conner |
| 5,067,751 A | 11/1991 | Walworth |
| 5,197,768 A | 3/1993 | Conner |
| 5,360,218 A * | 11/1994 | Percebois ........... F16L 37/0845 277/619 |
| 5,426,842 A | 6/1995 | Deboalt |
| 5,520,419 A | 5/1996 | Deboalt |

* cited by examiner

*Primary Examiner* — Anna M Momper
*Assistant Examiner* — Fannie C Kee
(74) *Attorney, Agent, or Firm* — Miles & Stockbridge PC; David R. Schaffer

(57) ABSTRACT

Pipe joints and more particularly circular push-on type pipe joints including a flexible gasket having both hard and soft sections and where the hard section has a chamfered outer edge and a "C"-shaped grooved portion on a side opposite of the chamfered outer edge in which a portion of the soft section fills and is connected to and the soft section is configured to partially overlap a flange on an interior surface of a pipe bell end.

13 Claims, 8 Drawing Sheets

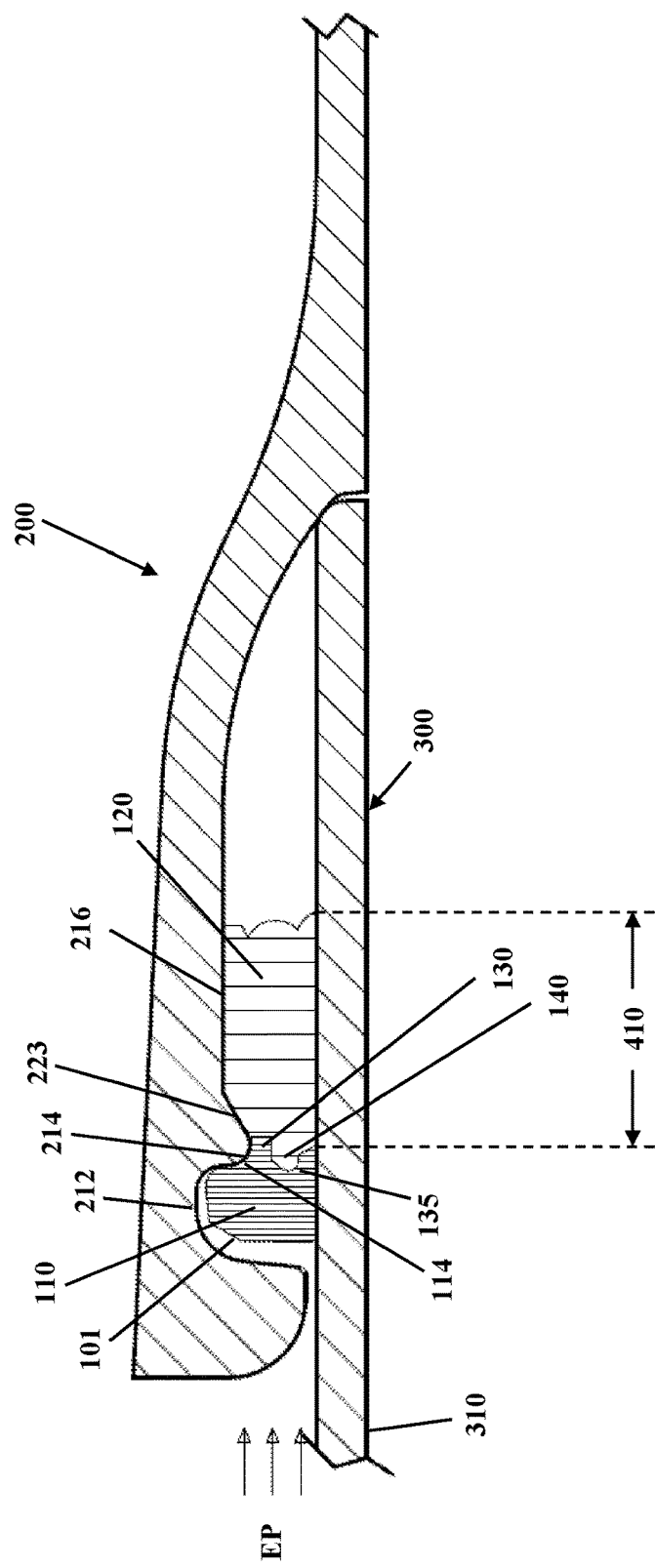

PIPE JOINT WITH LOW INSERTION LOAD, IMPROVED RETENTION AND INCREASED HIGH PRESSURE SEALING ABILITY GASKET AND METHOD OF MANUFACTURE THEREOF

CROSS-REFERENCE TO RELATED APPLICATIONS

Co-pending U.S. patent application, titled: Pipe Joint with Low Insertion Load, Improved Retention and High Pressure Sealing Ability Gasket and Method of Manufacture Thereof; Ser. No. 14/757,571, by the same inventor and filed concurrently with this application, the disclosure of which is hereby incorporated in its entirety herein.

TECHNICAL AREA

Pipe joints and more particularly circular push-on type pipe joints including a flexible gasket having both hard and soft sections and where the hard section has a chamfered outer edge and a "C"-shaped grooved portion on a side opposite of the chamfered outer edge in which a portion of the soft section fills and is connected to and the soft section is configured to partially overlap a flange on an interior surface of a pipe bell end.

SUMMARY

One or more embodiments include a circular gasket that can be made of a hard rubber portion and a soft rubber portion such as defined in the American Water Works Association Standard ANSI/AWWA C111/A21.11, but is not necessarily limited to the materials shown there. The purpose of the gasket is to remain in place, within the mating socket of a belled pipe during insertion assembly of a spigot end of a second pipe into the bell of the first pipe, and to make a dependable seal between the two pipe members when internal or external pressure is applied.

In short, embodiments include a push on gasket with both the hard rubber portion and the soft rubber portion where the hard portion and interface of the hard rubber portion and soft rubber portion has been uniquely shaped in an overlapping configuration to increase the gasket holding force within the socket, to reduce the required spigot insertion assembly force of the gasket joint, and also to increase the sealing area at the pipe spigot surface to improve sealing capabilities.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

FIGS. 4a, 4b, 4c are partial longitudinal, cross-sectional views of the bell and spigot pipe joint with the circular push-on type pipe joint with a gasket including both hard and soft sections of FIG. 3 at the completion of the insertion of a first pipe's spigot end into a second pipe's bell end, in accordance with an embodiment of the disclosed subject matter.

DETAILED DESCRIPTION

In general, one or more embodiments of the disclosed subject matter include (i.e., comprise) a pipe joint including a first pipe with a bell end with an interiorly extending axial flange formed around an inner surface of an end of the bell end, the interiorly extending flange having a substantially rounded outer edge and a substantially square inner edge with a wall extending outwardly toward and connecting with a first side of a concave groove formed in and extending around the inner surface and adjacent to the flange, a second side of the concave groove extending inwardly from a bottom of the concave groove to a rounded corner of a radial protrusion, which angularly extends away from the flange to meet with a substantially flat portion of the inner surface. The pipe joint further includes an annular gasket element including a first hard, relatively inflexible portion and a soft, relatively pliable portion, the first hard, relatively inflexible portion configured as a first substantially annular gasket hook portion with a chamfered outer edge between a front side and an outside of the first hard, relatively inflexible portion and two backwardly facing flanges that define a substantially "C"-shaped groove on a back side of the first hard, relatively inflexible portion to receive and attach to a reciprocally configured "C"-shaped protrusion on a front side of the second soft, relatively pliable portion attached to a back side of the first hard, relatively inflexible portion. The annular gasket further includes a recess formed in and around an outer surface of the annular gasket element between the first hard, relatively inflexible portion and the second soft, relatively pliable portion in a shape reciprocal to the radial protrusion, the second soft, relatively pliable portion having a substantially solid V-shaped configuration with an outer extension and an inner extension and a solid center with a substantially dome-shaped central protrusion between the outer and inner extensions, the outer extension having a length greater than the inner extension and having a substantially flat outer end surface portion configured to fit against the substantially flat portion of the inner surface of the end of bell end, and a section of the second soft, relatively pliable portion overlapping the first hard, relatively inflexible portion and extending past the recess formed in the annular gasket element of the first hard, relatively inflexible portion. The pipe joint further includes a second pipe with a spigot end with a rounded outer edge configured to fit within and be retained in the bell end of the first pipe and form a fluid-tight seal with the annular gasket element and the bell end of the first pipe.

Figure 1:
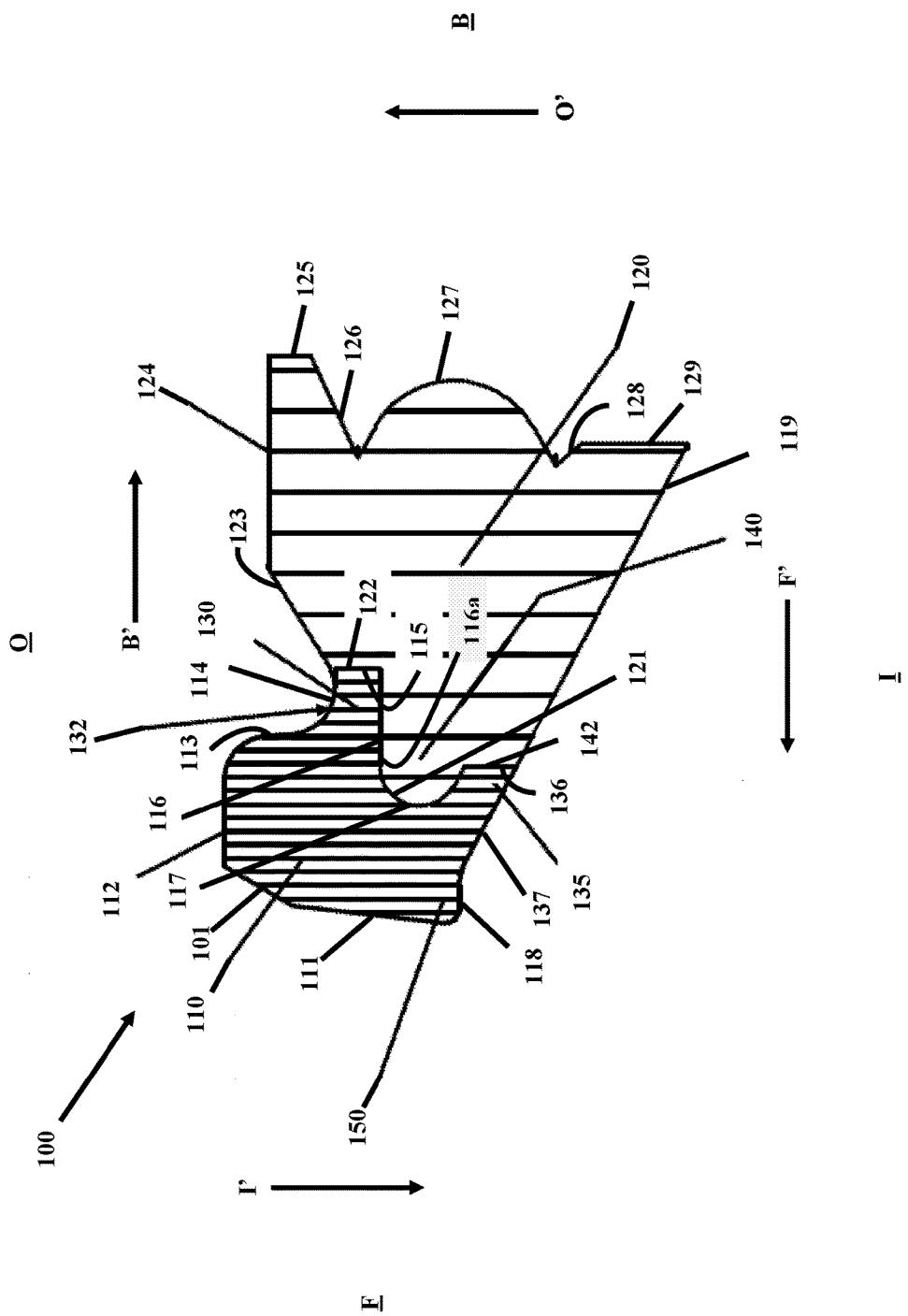
FIG. 1 is a cross-sectional view of a circular push-on type pipe joint gasket including both hard and soft sections, in accordance with an embodiment of the disclosed subject matter.

FIG. 1 is a cross-sectional view of a circular push-on type pipe joint gasket including both hard and soft sections, in accordance with an embodiment of the disclosed subject matter. While the following description is of the gasket cross-section shown in FIG. 1, it is understood that the entire gasket is a continuous, circular gasket that can be made in a variety of different diameters to fit the various pipe diameters in which it is designed to be used. For the sake of clarity and consistency in the following description, FIG. 1 has been labeled to illustrate the descriptive positional terms associated with the gasket. Specifically, a "front" or "front side" F is shown on the left of the gasket 100, an "outside" O is shown above the gasket 100, a "back" or "back side" B is shown to the right of the gasket 100, and an "inside" 1 is shown below the gasket 100 of FIG. 1. In addition, directional movement and/or orientation will be described using "inward" I' to describe movement and/or orientation running from the outside to the inside; "outward" O' to describe movement and/or orientation running from the inside to the outside; "forward" F' to describe movement and/or orientation running from the back to the front; "backward" B' to describe movement and/or orientation running from the front to the back.

Figure 2:
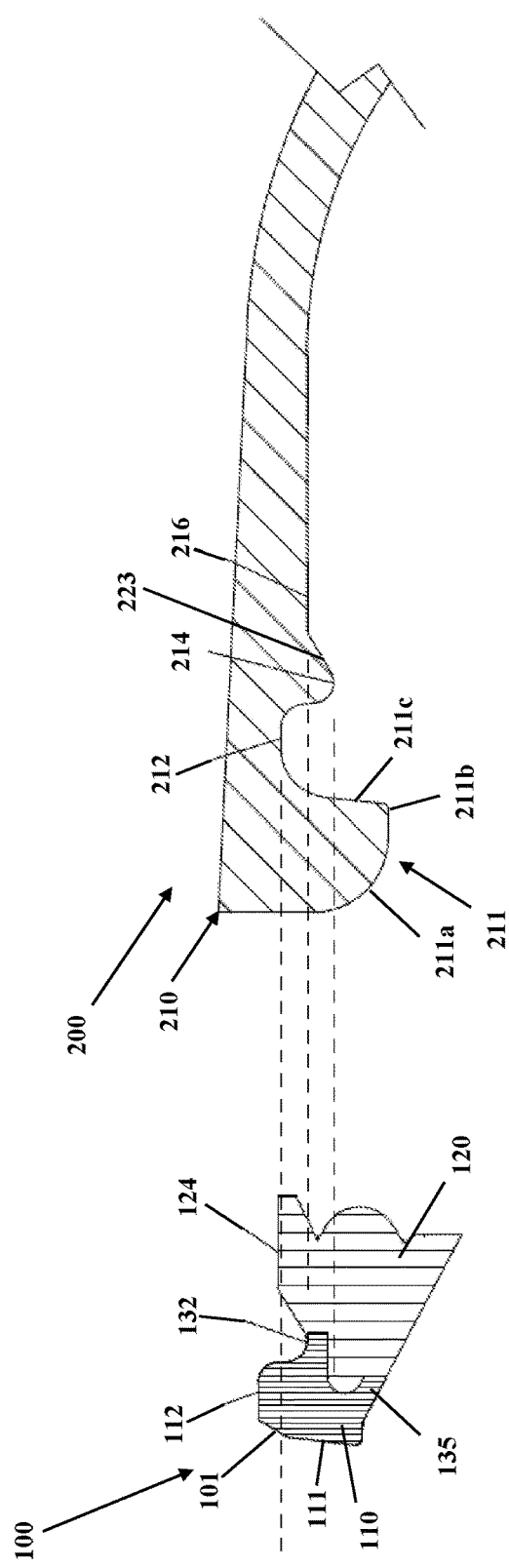
FIG. 2 is a partial longitudinal, cross-sectional view of a bell end of a pipe with a circular push-on type pipe joint with a gasket including both hard and soft sections of FIG. 1 prior to insertion into a bell end of a pipe, in accordance with an embodiment of the disclosed subject matter.
Figure 4A:
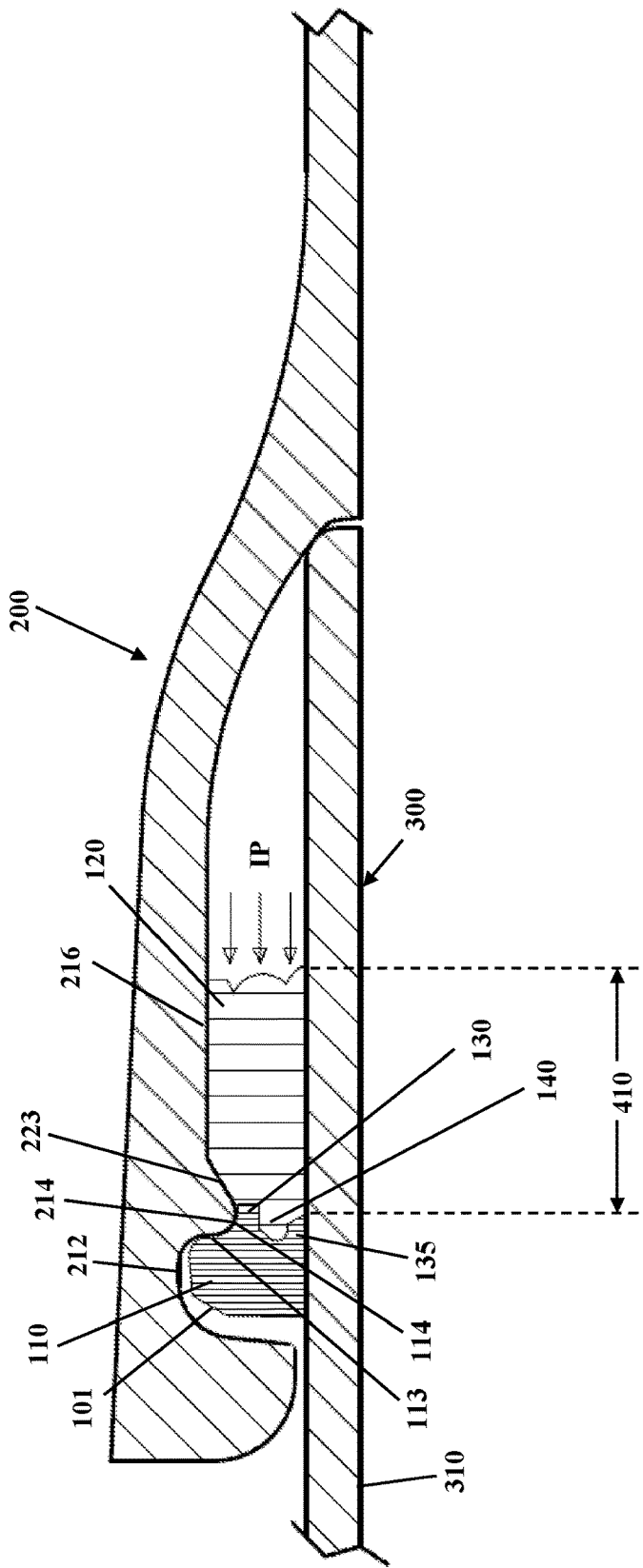

In FIG. 1 a gasket 100 includes two parts a front "hook" portion 110 and a back sealing portion 120. The front hook portion 110 has an outside diameter (OD) defined by an outside wall 112 that is larger than a socket or groove 212 inside diameter (ID) of a pipe bell end 210 of a pipe 200, as seen in FIG. 2 and in FIG. 1, a top end of a top back wall 113 connects via a rounded outside corner and extends inwardly from a back end of the outside wall 112. The top back wall 113 extends inwardly toward and connects via a curved inside corner to a front end of a lower outside wall 114 with an OD that is larger than an ID of a substantially round radial protrusion 214 of the pipe bell end 210 of FIG. 2. The substantially round radial protrusion 214 is formed posteriorly to the socket or groove 212 and gasket 100 is shaped, configured and adapted to fit and mate into the socket or groove 212 ID and substantially round radial protrusion 214 ID of the pipe 200 bell end 210 and the back sealing portion 120 is shaped, configured and adapted to fit and mate against a backwardly and outwardly extending back surface 223 of the substantially round radial protrusion 214 and an inside surface of the bell end 216 in a manner to hold the gasket in place when a pipe spigot is fully, axially inserted into the gasket socket and when internal (or external) pressure acts on the gasket in the assembled joint as shown in FIG. 4a and FIG. 4b. Returning to FIG. 2, the back sealing portion 120 of the gasket 100 is made with a material that is relatively soft and forms a seal between a pipe spigot 310 and the backwardly and outwardly extending back surface 223 of the substantially round radial protrusion 214 and the inside surface of the bell end 216 in the assembled joint. Softer rubber as defined by the ANSI/AWWA C111/A21.11 standard (Table 8) is known to have better sealing properties than very hard rubber, because it molds and more intimately forms itself better around surface inconsistencies and surface roughness which are common in pipe, such as as-cast ductile iron pipe. The softer rubber used in the back sealing portion 120 not only reduces assembly insertion force, but also forms a longer anti-leakage contact pathway 410 with the more sealable softer material effecting a more assured and dependable seal around the spigot pipe. Returning to FIG. 1, the front hook portion 110 is made from a rubber with a hard durometer, for example, a Shore "A" durometer hardness of about 80 to 85. The back sealing portion 120 of the gasket 100 is made from a rubber with a softer durometer, for example, a Shore "A" durometer hardness of about 50 to 65.

In FIG. 1, the front hook portion 110 has an inwardly and slightly forwardly extending front wall 111 that at a top end connects via an obtuse-angled corner to a lower end of a chamfered section 101 and a top end of the chamfered section 101 connects via another obtuse-angled corner to a front end of the outside wall 112. The chamfered section 101 increases the ease and efficiency of inserting the gasket into the pipe 200 in FIG. 2. Returning to FIG. 1, a back end of the outside wall 112 connects via the rounded corner to the top end of the top back wall 113 that extends substantially perpendicularly inwardly and away from the outside wall 112. The top back wall 113 at a bottom end connects via an inside curved corner to a front end of the lower outside wall 114 that extends away from and substantially perpendicularly to the top back wall 113. The lower outside wall 114 ends and connects at a sharp corner to a top end of an inwardly and perpendicularly extending middle back wall 115. At a bottom end, the middle back wall 115 connects via a sharp corner to a back end of a forwardly and perpendicularly extending bottom wall first portion 116, which is in turn connected at a front end to a top end of an inwardly curved and backwardly extending, "C"-shaped back wall portion 117. The "C"-shaped back wall portion 117 forms a curved inner wall grooved portion of the front hook portion 110. A lower end of the "C"-shaped back wall portion 117 is connected via a sharp corner to a top end of an inwardly and perpendicularly extending lower back wall 136. The lower back wall 136 connects at a bottom end via an acute-angle sharp corner to a back end of an outwardly and forwardly extending inside wall rear portion 137. A front end of the inside wall rear portion 137 connects via an obtuse-angled inside corner to a back end of a forwardly extending inside wall front portion 118, which connects at a front end via a rounded corner to a bottom end of the front wall 111 to define a lower inside portion 150 of the front hook portion 110. A bottom half of the C"-shaped back wall portion 117, the lower back wall 136 and the inside wall rear portion 137 define an inside flange 135.

In FIG. 1, the back sealing portion 120 of the gasket 100 has a substantially solid sideways, notched "V"-shape that is connected to the front hook portion 110. Specifically, the cross-sectional shape of the back sealing portion 120 has a front, lower outside surface 116a that is reciprocally shaped and attached to the bottom wall first portion 116, a reciprocally shaped "C"-shaped protrusion 140 has a front wall 121 that connects to a front end of the bottom wall first portion 116 and is attached to the "C"-shaped back wall portion 117. A bottom front wall 142 connects at a top end via a sharp corner to a bottom end of the "C"-shaped protrusion 121 and is attached to the lower back wall 136 of the front hook portion 110. A back end of the lower outside surface 116a is connected via a sharp corner to a bottom end of a top front wall surface 122 that extends outwardly and perpendicularly away from the top end of the lower outside surface 116a and the top front wall surface 122 is attached to the entirety of the middle back wall 115 of the front "hook" portion 110. A top end of the top front wall surface 122 connects via an obtuse angled corner to a front end of a middle outer surface portion 123 that angles backwardly and outwardly away from the top end of the front wall surface 122. A recess 132 is defined in the outside of the gasket 100 by the top back wall 113 and the lower top wall 114 of the front "hook"

portion 110 and the middle outside surface portion 123 of the back sealing portion 120. The lower top wall 114, the middle back wall 115 and the bottom wall first portion 116 together define an axial bearing extension or outside flange 130. As seen in FIG. 1, outside flange 130 starts, extends and ends backward of an end of the inside flange 135. Although not shown in FIG. 1, in another embodiment of the gasket 100, the outside flange 130 of the front hook portion 110 can extend backwardly and outwardly along some or substantially all of the middle outer surface 123.

In FIG. 1, at a back end of the middle outer surface 123, a front end of a front end of an upper outer surface 124 of the back sealing portion 120 is connected to and angles backwardly away from the back end of the middle outer surface 123 at an acute angle and the upper outer surface 124 is substantially perpendicularly aligned with the top front wall surface 122. A back end of the upper outer surface 124 is connected via a sharp corner to a top end of a back wall surface 125 of the back sealing portion 120 that extends inwardly and perpendicularly away from the upper outer surface 124. A top inward back wall surface 126 of the back sealing portion 120 is connected to and extends forwardly and inwardly away from a bottom end of the top back wall surface 125. A bottom end of the top inward back wall surface 126 connects to a top end of a convex back wall surface 127 that extends backwardly and inwardly to about a midpoint of its length and then forwardly and inwardly to form a substantially semi-circular cross-sectional shape. A bottom inward back wall surface 128 is connected at its top end to a bottom end of the convex and backwardly extending back wall surface 127 and extends inwardly and backwardly away from the convex back wall surface 127 to a top end of a bottom back wall surface 129. The bottom back wall surface 129 extends inwardly away from the bottom inward back wall surface 128 and at a bottom end connects via an acute angled corner to a back end of an inside wall surface 119 where the bottom back wall surface 129 is substantially parallel to the top back wall surface 125. The bottom wall surface 119 extends forwardly and outwardly away from the bottom back wall surface 129 and a front end of the bottom wall surface 119 connects to a bottom end of the bottom front wall surface 142.

As seen in FIG. 1, the "C'-shaped protrusion 140 of the back sealing portion 120 shown between the outside flange 130 and the inside flange 135 of the front hook portion 110 provides a section of the softer back sealing portion 120 that can be compressed between the two flanges 130, 135 when the pipe joint is fully assembled. In accordance with at least one embodiment, the thicknesses of the outside flange 130 and the inside flange 135 are about 50 to 60 percent of the thickness of the C'-shaped protrusion 140 in its uncompressed state. Specifically, when the spigot end of one pipe is inserted into a gasketed, bell end of a second pipe, the extra section of the back sealing portion 120 provides for additional radial, outward pressure to force the outsides of both the front hook portion 110 and the back sealing portion 120 against the inner diameter of the bell end of the second pipe. This is best seen in and will be later described herein in relation to FIG. 4.

Similar to the gasket in FIG. 1, current push-on gaskets rely on designs where the outside diameter of the free gasket is greater than the pipe socket inside diameter, which makes the gasket compress circumferentially and exert a larger residual outward radial force against the pipe socket inside diameter when the gasket is placed inside the pipe socket. This outward radial force increases the gasket's ability to stay in the socket during spigot insertion assembly with another pipe. As illustrated by the dashed lines in FIG. 2, outside surfaces 132 and 124, and to a lesser extent outside surface 112, in the pre-installed gasket are greater in diameter than the corresponding socket inside diameters 214, 216 and to a lesser extent 212. In one embodiment, the gasket most tightly contacts the socket at the circumferential surface mating locations of 132 and 214. For this reason the hard rubber section 110 has the axial bearing extension 130 with an external surface 132 which contacts the socket at 214. The harder material at 132 resists being compressed more than the softer material. This transfers more of the gasket's outward radial force against the socket inner circumferential surface than it would if the softer more compressible material were located at 132 thus assuring the gasket remains in the pipe socket more securely.

FIG. 2 is a partial longitudinal, cross-sectional view of a bell end of a pipe with a circular push-on type pipe joint with a gasket including both hard and soft sections of FIG. 1 prior to insertion into a bell end of a pipe, in accordance with an embodiment of the disclosed subject matter. In FIG. 2, the bell end 210 of the pipe 200 is shown to include an interior front lip portion 211, which includes a rounded front or exterior edge 211a and a substantially sharp rear or interior edge 211b from which an inner surface 211c of the lip portion 211 extends outwardly toward and merges into a front side of a substantially, concavely-shaped socket inside diameter 212. A back side of the substantially, concavely-shaped socket inside diameter 212 extends inwardly toward and merges into a front side of the substantially rounded radial protrusion 214 on an inner surface to the bell end 210 of the pipe 200. A back side 223 of the substantially rounded radial protrusion 214 continues backwardly at a reduced angle from the front side and merges into the inner surface 216 of the bell end 210 of the pipe 200. The substantially, concavely-shaped socket inside diameter 212 extends about twice as far above the radial protrusion 214 than does the inner surface 216. This permits the recess 132 of the gasket to mate with and be held in place by the radial protrusion 214 on the inside diameter of the bell end 210 of the pipe 200. In general, an outer diameter of the front hook portion 110 measured around the outside wall 112 is at least equal to an inner diameter of the substantially, concavely-shaped socket inside diameter 212. In one or more embodiments, the outer diameter of the front hook portion 110 measured around the outside wall 112 is about 1 to 3 percent (%) larger than the inner diameter of the substantially, concavely-shaped socket inside diameter 212.

Figure 3:
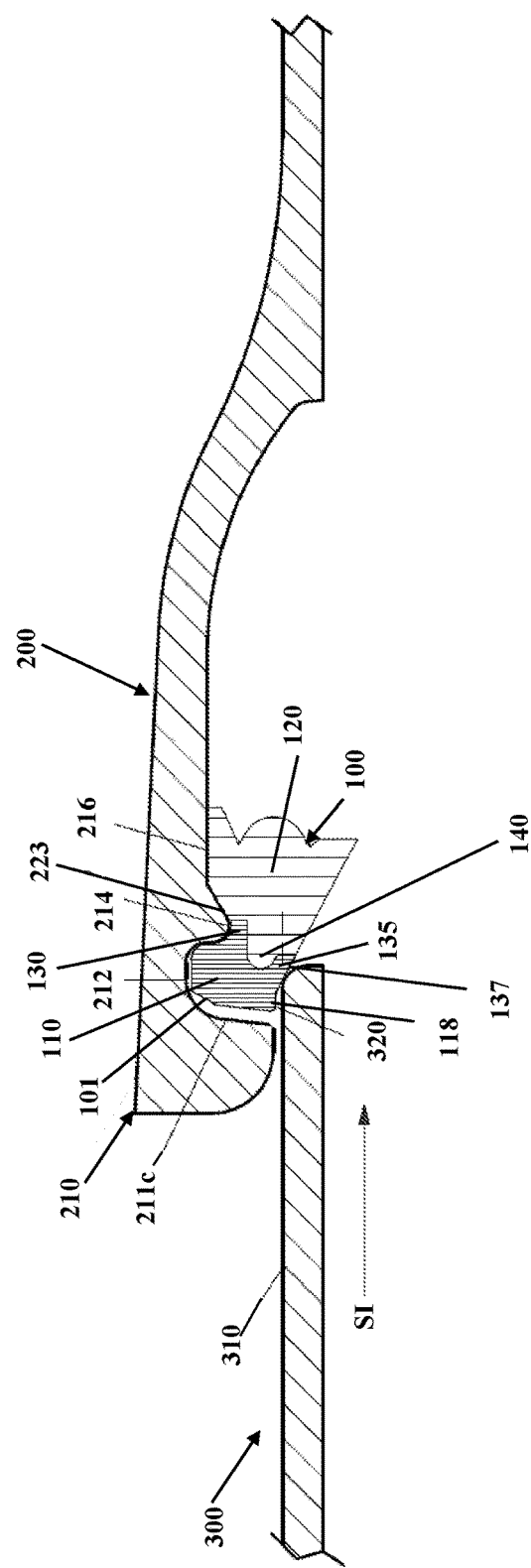
FIG. 3 is a partial longitudinal, cross-sectional view of a bell and spigot pipe joint with the circular push-on type pipe joint with a gasket including both hard and soft sections of FIG. 1 at the start of the insertion of a first pipe's spigot end into a second pipe's bell end, in accordance with an embodiment of the disclosed subject matter.

FIG. 3 is a partial longitudinal, cross-sectional view of a bell and spigot pipe joint with the circular push-on type pipe joint with a gasket including both hard and soft sections of FIG. 1 installed in a bell end of a second pipe and at the start of the insertion SI of a first pipe's spigot end into the second pipe's bell end, in accordance with an embodiment of the disclosed subject matter. In FIG. 3, the "C"-shaped protrusion 140, which is defined between the outside flange 130 and the inside flange 135, is provided to permit the hard rubber inside flange 135 to more easily move outwardly and away from a spigot end 310 of a first pipe 300 as the spigot end 310 is inserted into the bell end 210 of the pipe 200. This decreases the insertion forces and provides an anti-leak pathway 410 of the softer material of the back sealing portion 120 contacting against the spigot end 310 of the first pipe 300 to assure better sealing capabilities, as seen in FIG. 4. Returning to FIG. 3, as the spigot end 310 is inserted into the bell end 210, a radial gap 320 is formed between the forwardly extending inside wall front portion 118 of the front hook portion 110 and the entering pipe spigot end 310 to create an initial buffer from any contact between the hard rubber and the entering pipe spigot surfaces until the spigot 310 contacts the inside wall rear portion 137 of the inside flange 135. In general, this gap is formed regardless of the necessary pipe tolerance variations, at least initially. Any radial inward gasket movement of the front hook portion 110 due to frictional effects during the spigot insertion does not result in any compression of the front hook portion 110. However, due to the greater friction between the hard rubber lower flange 135 and the entering pipe spigot end 310, the gap 320 can close up due to some radial inward movement caused by the axial inward movement of the gasket 100 due to spigot/gasket friction during the entering pipe spigot end 310 insertion. While present, the gap 320 reduces the amount of radial load that the gasket hard portion 118 exerts on the entering pipe spigot end 310, which reduces the assembly load. The "C"-shaped protrusion 140 of the back sealing portion 120 radially separates the two flanges 130, 135 and compresses when the spigot end 310 is inserted into the gasket 100 and the pipe 200 in order to increase the radial ring stiffness of the gasket upon full insertion. This design is shaped so as not to interfere with the entering pipe's spigot end 310 and to reduce the insertion force necessary during insertion assembly as compared to prior gasket designs. In general, the stiffer the gasket ring strength the more securely the gasket will be retained in the pipe socket during insertion assembly and during sealing.

Figure 4C:
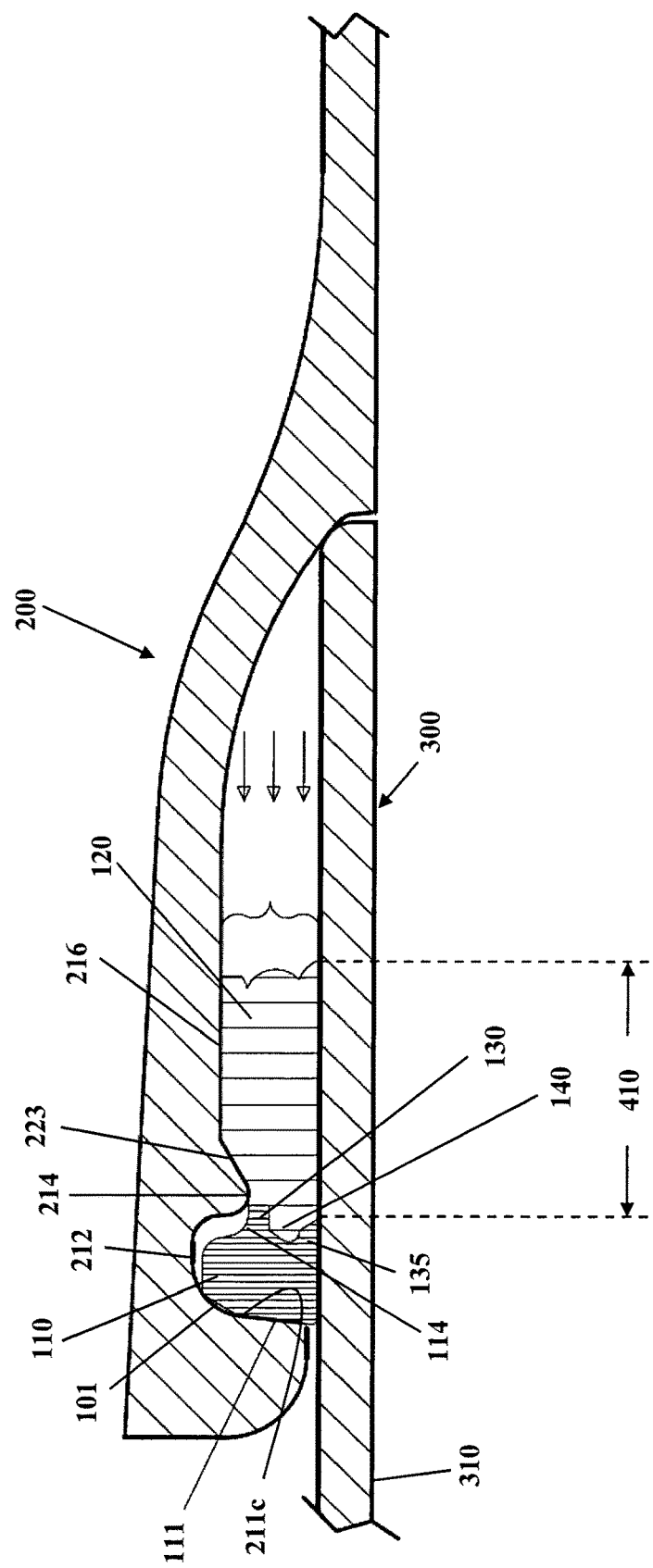

Specifically, in FIG. 3, the gasket outside diameter includes the front hook portion 110, which fits and mates to the socket inside diameter 212 to hold the gasket in place when the pipe spigot end 310 is axially inserted into the gasket 100 in the socket inside diameter 212 and when internal (or external) pressure acts on the gasket in the assembled joint, as shown in FIGS. 4a, 4b and 4c. Returning to FIG. 3, the gasket also includes the back sealing portion 120, which is made of a relatively soft material such as, for example, but not limited to those materials defined in the American Water Works Association Standard ANSI/AWWA C111/A21.11, and a recess 132, which essentially separates the two sections of the gasket (see FIG. 2) and, returning to FIG. 3, mates with the radial protrusion 214 on the inner surface of the bell end 210 of the pipe 200. The gasket 100 addresses the problems associated with gasketed pipe by using a hard rubber hook that is ideally contoured, so that the hard rubber section 110 of the gasket substantially fills the socket recess 212 and only minimally contacts the entering spigot end 310 near the inside diameter of the back sealing portion 120 during insertion assembly.

FIGS. 4a, 4b, 4c are partial longitudinal, cross-sectional views of the bell and spigot pipe joint with the circular push-on type pipe joint with the gasket 100 including both hard and soft sections 110, 120 of FIG. 3 at the completion of the insertion of the first pipe's spigot end 310 into the second pipe's bell end 210. In FIG. 4a, the spigot end 310 of the first pipe 300 is shown fully inserted into the bell end 210 of the second pipe 200 and through the gasket 100. As illustrated in FIG. 4a, the front hook portion 110 is shown with an outside portion located in the substantially, concavely-shaped socket inside diameter 212 and the top back wall 113 and the lower outside wall 114 being biased against the substantially rounded radial protrusion 214 of the bell end 210 of the second pipe 200. In addition, as a result of the spigot end 310 being inserted through the gasket 100, the front hook portion 110 has partially rotated toward and the inside surfaces of the front hook portion 110 is in contact with and around the outside circumference of the spigot end 310. Specifically, the forwardly extending inside wall front portion 118 and the inside wall rear portion 137 of the front hook portion 110 is in contact around the outside circumference of the spigot end 310. In addition, the back sealing portion 120 has been compressed and elongated to form a water-tight seal between the outer surface of the spigot end 310 and the inner surface of the bell end 210. The compressed and elongated back sealing portion 120 has a length 410 along the surface of the spigot end 310 that is significantly longer than the uncompressed length of the bottom wall surface 119. Likewise, the outside surfaces 123, 124 of the back sealing portion 120 are similarly compressed and elongated against the inner surface 216 of the bell end 210 of the pipe 200. The front hook portion 110 and the back sealing portion 120 cooperate together to form a stationary, water-tight seal between the spigot end 310 and the inner surface of the bell end 210 that resists movement as a result of any internal pressure IP of the fluid within the pipes pushing out and against the back sealing portion 120, or as a result of any external pressure EP pushing in and against the front hook portion 110.

At very high internal pressures the entire gasket can be forced towards the front of the socket as in FIG. 4c, so as to be supported by the primarily radial surface 211c of the pipe socket as the internal pressure supplies a force in that direction equal to the pressure times the exposed gasket surface area. When this occurs the hard rubber flanges 130, 135 trap the easily compressible soft rubber and contain it by acting as a plug to prevent the soft sealing rubber from extruding beyond the socket. The cupped shape of the hard rubber interface retains the soft sealing end 120 with great support at the spigot OD surface and socket ID surface due to the flanges 130, 135. Conversely, when very high external pressures are present, as in FIG. 4b, the gasket can be forced back to its originally installed position as seen in both FIGS. 4a and 4b.

Figure 5:
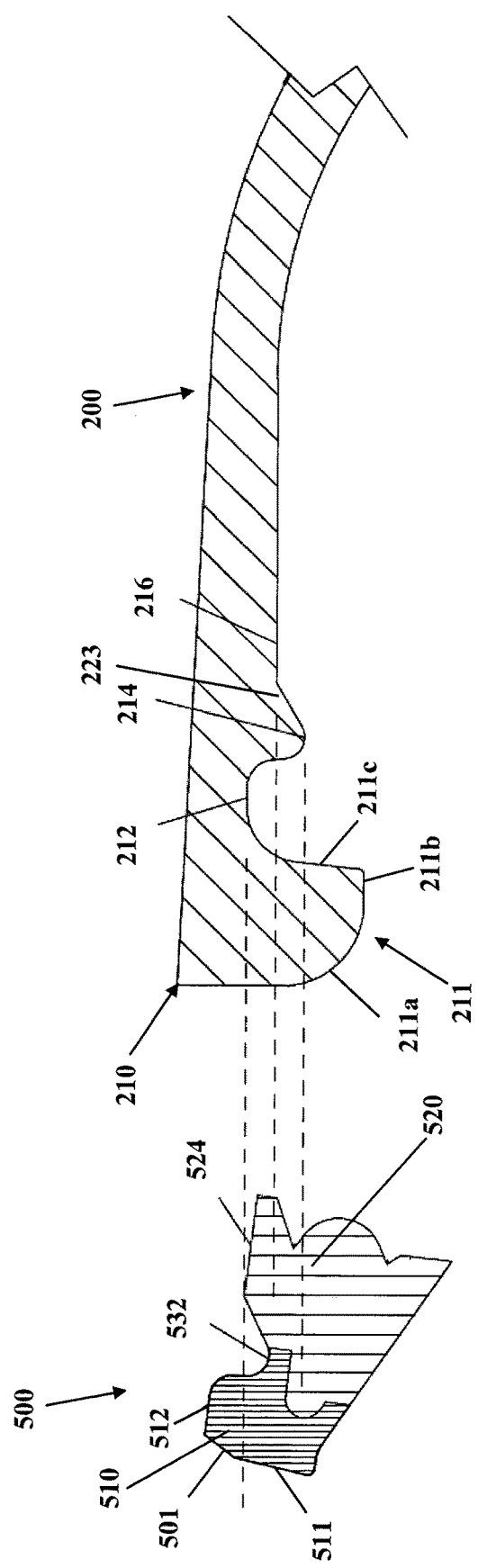
FIG. 5 is a cross-sectional view of a larger circular push-on type pipe joint gasket with both hard and soft sections having an outside diameter that is greater than the gasket of FIG. 1, in accordance with another embodiment of the disclosed subject matter.

FIG. 5 is a cross-sectional view of a larger circular push-on type pipe joint including a gasket with both hard and soft sections having an outside diameter that is greater than the gasket of FIG. 1, in accordance with another embodiment of the disclosed subject matter. In FIG. 5, a gasket 500 with a hard front hook portion 510 with a chamfered front inside corner 501 and a soft back portion 520 in the free state, i.e., prior to installation into the bell end 210 of the pipe 200 as in FIG. 2, and is also made such that all outside diametrical surfaces at a slightly forwardly and inwardly extending front wall 511, an outside wall 512, an upper outer surface 524 and a lower outside surface 532 of the gasket 500 are larger than any inner diameter mating surfaces 212, 214, 216 in the mating pipe socket 210. A hook portion 510 of the gasket, however, is larger than the socket by an amount even greater than that of a back sealing portion 520. This increased diameter of the gasket 500 allows even more radial outward force of the gasket to be placed primarily at a recess 532 against the substantially rounded radial protrusion 214 and thus even more securely holding the gasket in place. Also, as shown in relation to the dashed lines in FIG. 5, the gasket 500 is angled or tilted so that the front end of the outside surface of the front hook portion 510 is raised above the back end of the outside surface of the front hook portion 510, and, similarly, the front end of the upper outer surface 524 is raised above the back end of the upper outer surface 524. This configuration serves to provide more pre-compression on the front hook portion 510 than on the upper outer surface 524. In general, an outer diameter of the front hook portion 510 measured around the outside wall 512 is at least equal to an inner diameter of the substantially, concavely-shaped socket inside diameter 212. In one or more embodiments, the outer diameter of the front hook portion 510 measured around the outside wall 112 is about 3 to 5 percent (%) larger than the inner diameter of the substantially, concavely-shaped socket inside diameter 212. Although not explicitly identified, the surfaces/elements in FIG. 5 correspond to and have the same names and descriptions as the equivalent surfaces/elements as shown and described above in relation to FIG. 2

In FIG. 5, the bell end 210 of the pipe 200 from FIG. 2 is shown, including the interior front lip portion 211, the rounded front or exterior edge 211*a* and the substantially sharp rear or interior edge 211*b* from which the inner surface 211*c* of the lip portion 211 extends outwardly toward and merges into the front side of the substantially, concavely-shaped socket inside diameter 212. The back side of the substantially, concavely-shaped socket inside diameter 212 extends inwardly toward and merges into the front side of the substantially rounded radial protrusion 214 on the inner surface to the bell end 210 of the pipe 200. The back side of the substantially rounded radial protrusion 214 continues backwardly at a reduced angle from the front side and merges into the inner surface 216 of the bell end 210 of the pipe 200. The substantially, concavely-shaped socket inside diameter 212 extends about twice as far above the radial protrusion 214 than does the inner surface 216. This permits the recess 132 of the gasket to mate with and be held in place by the radial protrusion 214 on the inside diameter of the bell end 210 of the pipe 200.

Figure 6:
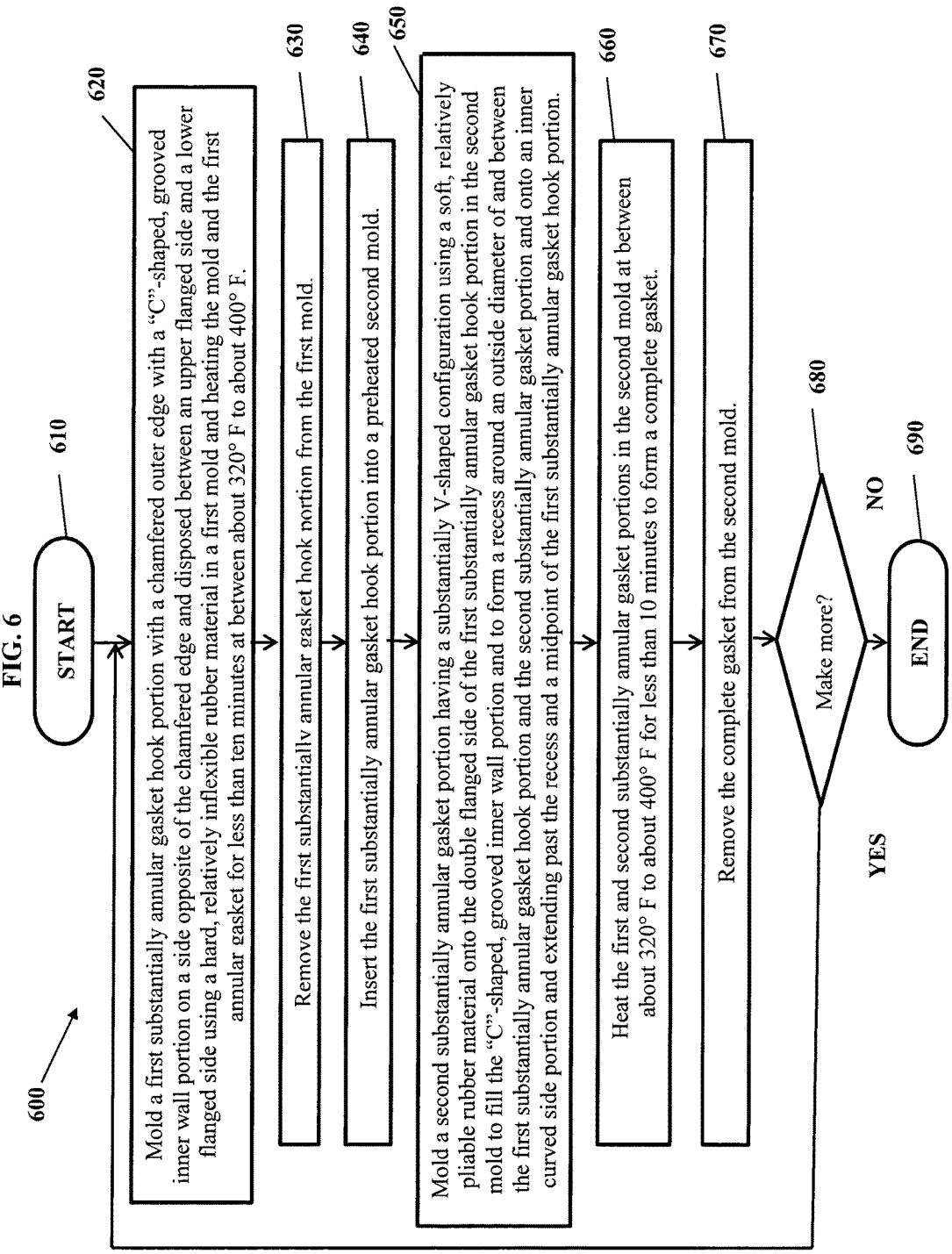
FIG. 6 is a flow chart of a method of manufacturing a circular push-on gasket with both hard and soft sections so that the hard section and soft section are in an overlapping relationship and are permanently affixed to each other, in accordance with another embodiment of the disclosed subject matter.

FIG. 6 is a flow chart of a method of manufacturing a circular push-on gasket with both hard and soft sections so that the hard section and soft section are in an overlapping relationship and are permanently affixed to each other, in accordance with another embodiment of the disclosed subject matter. In FIG. 6, the method 600 of manufacturing a circular push-on gasket with both hard and soft sections so that the hard section and soft section are in an overlapping relationship and are permanently affixed to each other starts 610 and then a first substantially annular gasket hook portion with a chamfered outer edge with a "C"-shaped, grooved inner wall portion on a side opposite of the chamfered edge and disposed between an upper flanged side and a lower flanged side using a hard, relatively inflexible rubber material is molded 620, e.g., injection molded, in a first mold with mold platen temperatures ranging from about 320° F. to about 400° F. for no more than 10 minutes to vulcanize the first substantially annular gasket hook portion. After the hard, relatively inflexible rubber material has set, the first substantially annular gasket hook portion with a flanged side is removed 630 from the first mold. The next step, which can be performed immediately following the prior removing 630 step or at some time later, the first substantially annular gasket hook portion with two flanged sides, is inserted 640 into a preheated second mold. The second mold includes a complete gasket shape into which the first substantially annular gasket hook portion with a flanged side is inserted. Then, a second substantially annular gasket portion having a substantially V-shaped configuration is molded 650, e.g., injection molded, onto the double flanged side of the first substantially annular gasket hook portion in the second mold to fill the "C"-shaped, grooved inner wall portion and to form a recess around an outside diameter of and between the first substantially annular gasket hook portion and the second substantially annular gasket portion and onto an inner curved side portion and extending past the recess and a midpoint of the first substantially annular gasket hook portion. The mold platen temperatures of the second mold range from about 320° F. to about 400° F. and the complete gasket is heated 660 in the second mold for no more than 10 minutes at this temperature to fully vulcanize the gasket. The method also includes removing 670 the completed gasket from the mold, determining 680 whether more gaskets are to be made and, if more are to be made, returning to molding step 620 to continue and, if no more are to be made, then the method ends 690. After the molding process is complete some gaskets may have excess material extending from the sides of the gasket, which is a result of extra rubber being squeezed out of the mold and between the mold portions. As a result, some gaskets are trimmed to remove the excess.

In the method in FIG. 6, the molding 620 of the first substantially annular gasket hook portion further includes molding 620 the first substantially annular gasket hook portion with an outside wall portion having a substantially flat outer diameter connected at a front end to a top end of a forwardly and inwardly extending chamfered edge, and a flat front side wall connected at a top end to and depending slightly forwardly and inwardly away from a bottom end of the chamfered edge. Molding 620 the first substantially annular gasket hook portion further includes molding 620 the first substantially annular gasket hook portion using a rubber having a Shore "A" durometer of about 80 to 85.

In the method in FIG. 6, molding 650 the second substantially annular portion further includes molding 650 the second substantially annular portion to have the substantially solid, V-shaped cross section and molding 650 the second substantially annular portion includes molding the second substantially annular portion connected to the "C"-shaped inner wall portion of the first substantially annular gasket hook portion. The method also includes molding the second substantially annular portion by molding the second substantially annular portion using a rubber having a Shore "A" durometer of about 50 to 65. The method still further includes molding the second substantially annular portion by molding the second substantially annular portion using a rubber having a Shore "A" durometer of about 55 to 60.

In an alternate embodiment, the gasket design of FIGS. 1 to 6 can be made without the chamfered edge 101 similar to that disclosed in co-pending U.S. patent application, titled: Pipe Joint with Low Insertion Load, Improved Retention and High Pressure Sealing Ability Gasket and Method of Manufacture Thereof; Ser. No. 14/757,571, by the same inventor and filed concurrently with this application, the disclosure of which is hereby incorporated in its entirety herein.

In an embodiment of the disclosed subject matter, a pipe joint includes a first pipe with a bell end with an interiorly extending axial flange formed around an inner surface of an end of the bell end, the interiorly extending flange having a substantially rounded outer edge and a substantially square inner edge with a wall extending outwardly toward and connecting with a first side of a concave groove formed in and extending around the inner surface and adjacent to the flange, a second side of the concave groove extending inwardly from a bottom of the concave groove to a rounded corner of a radial protrusion, which angularly extends away from the flange to meet with a substantially flat portion of the inner surface. The pipe joint further includes an annular gasket element including a first hard, relatively inflexible portion and a soft, relatively pliable portion, the first hard, relatively inflexible portion configured as a first substantially annular gasket hook portion with a chamfered outer edge between a front side and an outside of the first hard, relatively inflexible portion and two backwardly facing flanges that define a substantially "C"-shaped groove on a back side of the first hard, relatively inflexible portion to receive and attach to a reciprocally configured "C"-shaped protrusion on a front side of the second soft, relatively pliable portion attached to a back side of the first hard, relatively inflexible portion. The annular gasket further includes a recess formed in and around an outer surface of the annular gasket element between the first hard, relatively inflexible portion and the second soft, relatively pliable portion in a shape reciprocal to the radial protrusion, the second soft, relatively pliable portion having a substantially solid V-shaped configuration with an outer extension and an inner extension and a solid center with a substantially dome-shaped central protrusion between the outer and inner extensions, the outer extension having a length greater than the inner extension and having a substantially flat outer end surface portion configured to fit against the substantially flat portion of the inner surface of the end of bell end, and a section of the second soft, relatively pliable portion overlapping the first hard, relatively inflexible portion and extending past the recess formed in the annular gasket element of the first hard, relatively inflexible portion. The pipe joint further includes a second pipe with a spigot end with a rounded outer edge configured to fit within and be retained in the bell end of the first pipe and form a fluid-tight seal with the annular gasket element and the bell end of the first pipe.

In an embodiment of the disclosed subject matter, a locking and sealing member is configured to axially restrain a spigot end of a first pipe and form a liquid-tight seal between the spigot end of the first pipe and a bell end of a second pipe, the locking and sealing member includes an annular gasket element including a first hard, relatively inflexible portion and a soft, relatively pliable portion, the first hard, relatively inflexible portion configured as a first substantially annular gasket hook portion with a chamfered outer edge between a front side and an outside of the first hard, relatively inflexible portion and two backwardly facing flanges that define a substantially "C"-shaped groove on a back side of the first hard, relatively inflexible portion to receive and attach to a reciprocally configured "C"-shaped protrusion on a front side of the second soft, relatively pliable portion attached to a back side of the first hard, relatively inflexible portion, with a recess being formed in and around an outer surface of the annular gasket element between the first hard, relatively inflexible portion and the second soft, relatively pliable portion in a shape reciprocal to the radial protrusion, the second soft, relatively pliable portion having a substantially solid V-shaped configuration with an outer extension and an inner extension and a solid center with a substantially dome-shaped central protrusion between the outer and inner extensions, the outer extension having a length greater than the inner extension and having a substantially flat outer end surface portion configured to fit against the substantially flat portion of the inner surface of the end of bell end, and a section of the second soft, relatively pliable portion overlapping the first hard, relatively inflexible portion and extending past the recess formed in the annular gasket element of the first hard, relatively inflexible portion.

A method of manufacturing a unitary gasket using two rubber materials of different hardness, the method includes molding a first substantially annular gasket hook portion with a chamfered outer edge with a "C"-shaped, grooved inner wall portion on a side opposite of the chamfered edge and disposed between an upper flange and a lower flange using a hard, relatively inflexible rubber material in a first mold and heating the mold and the first annular gasket for less than ten minutes at between about 320° F. to about 400° F. The method further includes removing the first substantially annular gasket hook portion from the first mold; inserting the first substantially annular gasket hook portion into a preheated second mold. The method still further includes molding a second substantially annular gasket portion having a substantially V-shaped configuration using a soft, relatively pliable rubber material onto the side of the first substantially annular gasket hook portion with the upper flange and the lower flange in the second mold to fill the "C"-shaped, grooved inner wall portion and to form a recess around an outside diameter of and between the first substantially annular gasket hook portion and the second substantially annular gasket portion and onto an inner curved side portion and extending past the recess and a midpoint of the first substantially annular gasket hook portion. The method still further includes heating the first and second substantially annular gasket portions in the second mold at between about 320° F. to about 400° F. for less than 10 minutes to form a complete gasket; and removing the complete gasket from the second mold.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:

1. A pipe joint comprising:
   a first pipe including a bell end with an interiorly extending axial flange formed around an inner surface of an end of the bell end, the interiorly extending flange having a substantially rounded outer edge and a substantially square inner edge with a wall extending outwardly toward and connecting with a first side of a concave groove formed in and extending around the inner surface and adjacent to the flange, a second side of the concave groove extending inwardly from a bottom of the concave groove to a rounded corner of a radial protrusion, which angularly extends away from the flange to meet with a substantially flat portion of the inner surface;
   an annular gasket element including a first hard, substantially inflexible portion and a second soft, substantially pliable portion, the first hard, substantially inflexible portion configured as a first substantially annular gasket hook portion with a chamfered outer edge between a front side and an outside of the first hard, inflexible portion and two backwardly facing flanges that define a substantially "C"-shaped groove on a back side of the first hard, substantially inflexible portion to receive and attach to a reciprocally configured "C"-shaped protrusion on a front side of the second soft, substantially pliable portion attached to a back side of the first hard, substantially inflexible portion, with a recess being formed in and around an outer surface of the annular gasket element between the first hard, substantially inflexible portion and the second soft, substantially pliable portion in a shape reciprocal to the radial protrusion, the second soft, substantially pliable portion having a substantially solid V-shaped configuration with an outer extension and an inner extension and a solid center with a substantially dome-shaped central protrusion between the outer and inner extensions, the outer extension having a length greater than the inner extension and having a substantially flat outer end surface portion configured to fit against the substantially flat portion of the inner surface of the end of the bell end, and a section of the second soft, substantially pliable portion overlapping the first hard, relatively substantially inflexible portion and extending past the recess formed in the annular gasket element of the first hard, substantially inflexible portion; and a second pipe including a spigot end with a rounded outer edge configured to fit within and be retained in the bell end of the first pipe and form a fluid-tight seal with the annular gasket element and the bell end of the first pipe.

2. The pipe joint of claim 1 wherein the "C"-shaped protrusion of the second soft, substantially pliable portion extends approximately to a middle of the first hard, substantially inflexible portion.

3. The pipe joint of claim 2 wherein an interior diameter of the first hard, substantially inflexible portion is greater than an interior diameter of the second soft, substantially pliable portion except at an inside junction of a back end of an inside wall rear portion of the first hard, substantially inflexible portion and a top end of an inside wall surface of the V-shaped, second soft, substantially pliable portion.

4. The pipe joint of claim 3 wherein the interior diameter of the first hard, substantially inflexible portion is greater than an outer diameter of the rounded outer edge of the spigot end of the second pipe at the start of the spigot end of the second pipe being inserted into the bell end of the first pipe and the annular gasket element.

5. The pipe joint of claim 4 wherein the interior diameter of the first hard, substantially inflexible portion is substantially the same as and is in contact with the outer diameter of the rounded outer edge of the spigot end of the second pipe when the spigot end of the second pipe is fully inserted into the bell end of the first pipe and the annular gasket element.

6. The pipe joint of claim 1 wherein the first hard, substantially inflexible portion comprises a rubber having a Shore "A" durometer of about 80 to 85.

7. The pipe joint of claim 1 wherein the second soft, substantially pliable portion comprises a rubber having a Shore "A" durometer of about 50 to 65.

8. The pipe joint of claim 1 wherein an outside one of the two backwardly facing flanges of the first hard, substantially inflexible portion begins distal to an end of an inside one of the two backwardly facing flanges.

9. A locking and sealing member configured to axially restrain a spigot end of a first pipe and form a liquid-tight seal between the spigot end of the first pipe and a bell end of a second pipe, the locking and sealing member comprising:

an annular gasket element including a first hard, substantially inflexible portion and a second soft, substantially pliable portion, the first hard, substantially inflexible portion configured as a first substantially annular gasket hook portion with a chamfered outer edge between a front side and an outside of the first hard, substantially inflexible portion and two backwardly facing flanges that define a substantially "C"-shaped groove on a back side of the first hard, substantially inflexible portion to receive and attach to a reciprocally configured "C"-shaped protrusion on a front side of the second soft, substantially pliable portion attached to a back side of the first hard, substantially inflexible portion, with a recess being formed in and around an outer surface of the annular gasket element between the first hard, substantially inflexible portion and the second soft, substantially pliable portion in a shape reciprocal to a radial protrusion of the bell end of the second pipe, the second soft, substantially pliable portion having a substantially solid V-shaped configuration with an outer extension and an inner extension and a solid center with a substantially dome-shaped central protrusion between the outer and inner extensions, the outer extension having a length greater than the inner extension and having a substantially flat outer end surface portion configured to fit against a substantially flat portion of an inner surface of an end of the bell end of the second pipe, and a section of the second soft, substantially pliable portion overlapping the first hard, substantially inflexible portion and extending past the recess formed in the annular gasket element of the first hard, substantially inflexible portion.

10. The locking and sealing member of claim 9 wherein the first hard, substantially inflexible portion comprises a rubber having a Shore "A" durometer of about 80 to 85.

11. The locking and sealing member of claim 10 wherein the second soft, substantially pliable portion comprises a rubber having a Shore "A" durometer of about 50 to 65.

12. The locking and sealing member of claim 9 wherein the "C"-shaped protrusion of the second soft, substantially pliable portion extends approximately to a middle of the first hard, substantially inflexible portion.

13. The locking and sealing member of claim 12 wherein the first hard, substantially inflexible portion has a circumference of an inner diameter that is greater than a circumference of an inner diameter of the second soft, substantially pliable portion except at the junction of a bottom wall front portion and a middle point of the V-shaped, second soft, substantially pliable portion.

\* \* \* \* \*